United States Patent
Kim

(10) Patent No.: US 9,967,454 B2
(45) Date of Patent: May 8, 2018

(54) DIGITAL IMAGE PHOTOGRAPHING APPARATUS AND METHOD OF CONTROLLING THE SAME

(75) Inventor: Na-young Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 350 days.

(21) Appl. No.: 13/270,372

(22) Filed: Oct. 11, 2011

(65) Prior Publication Data

US 2012/0162464 A1     Jun. 28, 2012

(30) Foreign Application Priority Data

Dec. 27, 2010     (KR) .................. 10-2010-0135586

(51) Int. Cl.
*H04N 5/232*     (2006.01)

(52) U.S. Cl.
CPC ..... *H04N 5/23216* (2013.01); *H04N 5/23212* (2013.01); *H04N 5/23245* (2013.01)

(58) Field of Classification Search
USPC ............... 348/333.01–333.13; 345/173–178
See application file for complete search history.

(56) References Cited

U.S. PATENT DOCUMENTS

| | | | |
|---|---|---|---|
| 6,919,927 B1 * | 7/2005 | Hyodo | ..................... 348/333.02 |
| 7,483,061 B2 | 1/2009 | Fredlund et al. | |
| 8,300,137 B2 | 10/2012 | Ogino | |
| 9,137,445 B2 | 9/2015 | Terashima | |
| 2004/0027467 A1 * | 2/2004 | Shiga | .................. H04N 5/2252 348/231.99 |
| 2006/0033701 A1 * | 2/2006 | Wilson | .......................... 345/156 |
| 2007/0081796 A1 * | 4/2007 | Fredlund et al. | ............. 386/125 |
| 2010/0171871 A1 * | 7/2010 | Ogino | ........................... 348/349 |
| 2010/0194963 A1 * | 8/2010 | Terashima | ............... 348/333.11 |
| 2011/0058056 A1 * | 3/2011 | Lindahl et al. | ............ 348/222.1 |
| 2011/0075012 A1 * | 3/2011 | Chen et al. | .............. 348/333.02 |

FOREIGN PATENT DOCUMENTS

| | | | | | |
|---|---|---|---|---|---|
| JP | 11-355617 | A | 12/1999 | | |
| JP | 2009-510837 | A | 3/2009 | | |
| JP | 2009-095002 | A | 4/2009 | | |
| JP | 2010-160269 | A | 7/2010 | | |
| JP | 2010-226319 | A | 10/2010 | | |
| WO | WO2010000118 | | * | 1/2010 | ............. H04N 5/232 |

OTHER PUBLICATIONS

Office Action issued in related application KR 10-2010-0135586, dated Sep. 8, 2016, with English language translation, 9 pages.

* cited by examiner

*Primary Examiner* — Christopher K Peterson

(74) *Attorney, Agent, or Firm* — Drinker Biddle & Reath LLP

(57) ABSTRACT

A digital image photographing apparatus and a method of controlling the same. The method includes: determining a focal area by a touch; if the touch continues for a first time period, performing a photographing operation to generate a first capture image; and if the touch continues for a second time period that is longer than the first time period, a successive capturing operation is performed until the touch is ended. Accordingly, auto-focusing may be performed by using a touching method, and a photographing may be performed while maintaining an auto-focusing result, and then successive capturing may be performed.

12 Claims, 7 Drawing Sheets

DIGITAL IMAGE PHOTOGRAPHING APPARATUS AND METHOD OF CONTROLLING THE SAME

CROSS-REFERENCE TO RELATED PATENT APPLICATION

This application claims the benefit of Korean Patent Application No. 10-2010-0135586, filed on Dec. 27, 2010, in the Korean Intellectual Property Office, the entire disclosure of which is hereby incorporated by reference.

BACKGROUND

Field of the Invention

The invention relates to digital image photographing apparatus and methods of controlling the same.

Description of the Related Art

In a successive capturing mode of a conventional digital camera, auto-focusing is performed by half-pressing a shutter button, and successive capturing is performed by fully pressing the shutter button and then releasing the shutter button.

However, when determining a focal area on a touch screen by touching the screen, it is not possible to perform successive capturing, and moreover, it is quite impossible to maintain auto-focusing of the focal area and then perform successive capturing.

Successive capturing may be variously used not only when photographing a moving object but also in panoramic photographing, bracket photographing, etc. Thus, when auto-focusing is performed by touch, a method to perform successive capturing while maintaining a result of focusing from a previous photographing operation is required.

SUMMARY

Therefore, there is a need in the art for a method of controlling a digital image photographing apparatus including a touch screen, the method comprising: generating a live view image; displaying the live view image on the touch screen; touching an area of the displayed live view image to perform a preprocessing operation; if the touch continues for a first time period, performing a photographing operation to generate a first capture image; and if the touch continues for a second time period that is longer than the first time period, performing a successive capturing operation until the touch is ended so as to generate second capture images after the first capture image.

The preprocessing operation may comprise at least one of auto-focusing, auto exposure, and auto white balance.

When the touch continues for the first time period, a photographing operation may be performed after the preprocessing operation, so as to generate the first capture image.

If the touch continues for the first time period, a photographing operation may be performed even when the preprocessing operation fails in order to generate the first capture image.

The method may further comprise generating a user notification signal when the preprocessing operation fails with respect to the touched one area.

If the touch continues for the first time period and the preprocessing operation fails, the first capture image may not be generated but a user notification signal may be generated.

The method may further comprise executing a panoramic photographing mode, wherein the first capture image and the second capture images are captured while moving the digital image photographing apparatus.

The first capture image and the second capture images may be images of a moving subject.

The method may further comprise executing a bracket photographing mode, wherein the first capture image and the second capture images are captured under different photographing conditions.

According to another aspect of the invention, there is provided a digital image photographing apparatus comprising: a live view image generating unit generating a live view image; a touch screen displaying the live view image and inputting a touch signal of a user; a preprocessor performing a preprocessing operation with respect to the live view image when the user touches one area of the displayed live view image; and a photographing controller controlling photographing to generate a first capture image if the touch continues for a first time period, and controlling successive capturing so as to generate at least one second capture image after the first capture image until the touch is ended if the touch continues for a second time period that is longer than the first time period.

The preprocessing operation may comprise at least one of auto-focusing, auto exposure, and auto white balance.

If the touch continues for the first time period, the photographing controller may control performing a photographing operation after the preprocessing operation so as to generate the first capture image.

If the touch continues for the first time period, the photographing controller may control a photographing operation so as to generate the first capture image even when the preprocessing operation fails.

The digital image photographing apparatus may further comprise a user notification signal generating unit generating a user notification signal when a preprocessing operation with respect to the touched one area fails.

If the touch continues for the first time period and the preprocessing operation has failed, the user notification signal generating unit may not generate the first capture image but a user notification signal.

The digital image photographing apparatus may further comprise a mode execution unit that executes a panoramic photographing mode, wherein the first capture image and the second capture images are captured while moving the digital image capture images.

The first capture image and the second capture images may be images of a moving subject.

The digital image photographing apparatus may further comprise a mode execution unit that executes a bracket photographing mode, wherein the first capture image and the second capture images are photographed under different photographing conditions.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION OF THE INVENTION

Hereinafter, a digital camera will be described with reference to the attached drawings as an example of a digital photographing apparatus. However, the invention is not limited thereto, and may also be applied to digital apparatuses such as digital camcorders, personal digital assistants (PDAs), smart phones, or the like.

Figure 1:
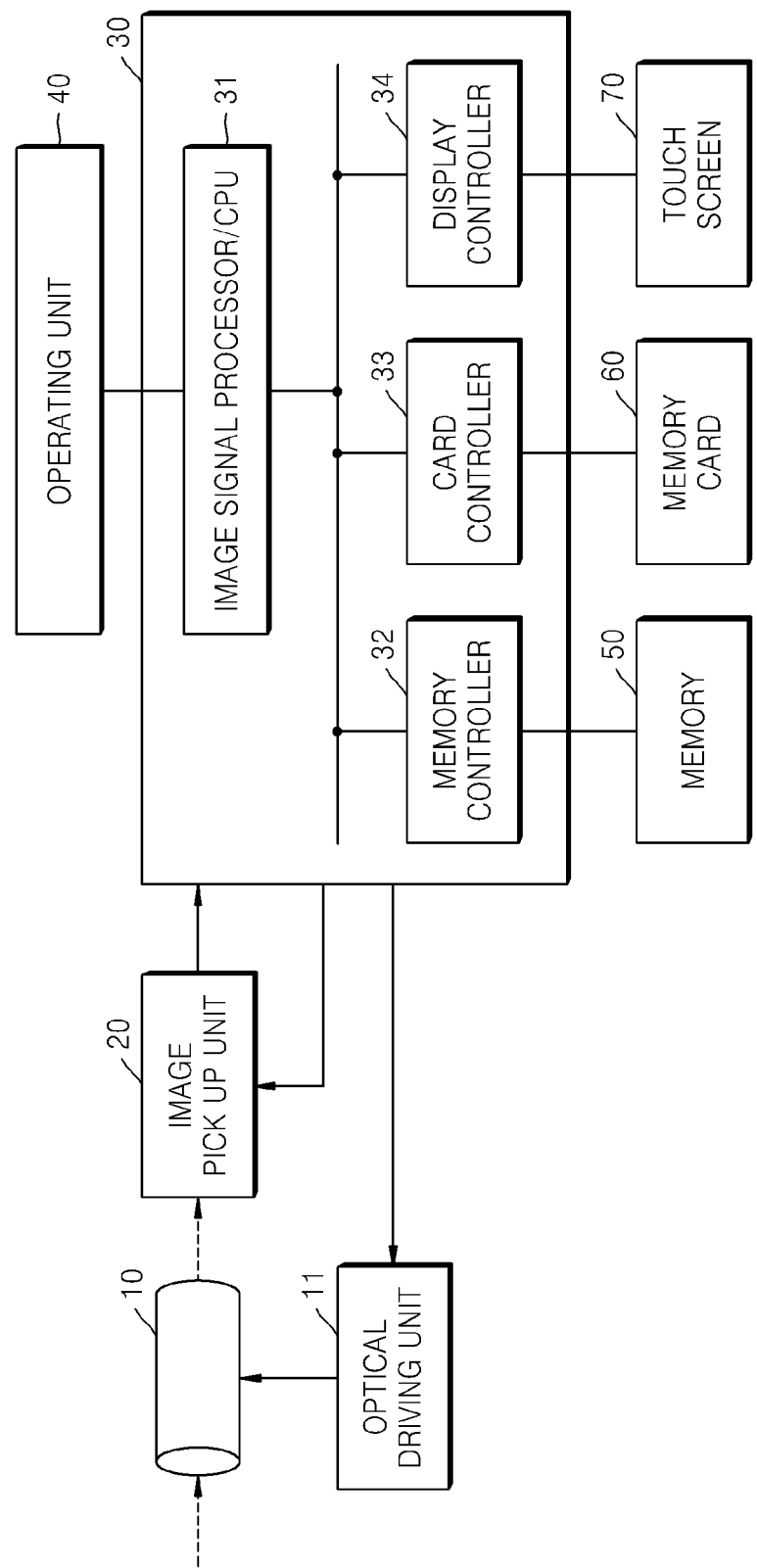
FIG. 1 is a block diagram illustrating a digital camera as an example of a digital image photographing apparatus, according to an embodiment of the invention.

FIG. 1 is a block diagram illustrating a digital camera as an example of a digital image photographing apparatus, according to an embodiment of the invention.

Referring to FIG. 1, the digital camera includes an optical unit 10, an optical driving unit 11 driving the optical unit 10, an image pickup unit 20, a camera controller 30, an operating unit 40, a memory 50, a memory card 60, and a touch screen 70.

The optical unit 10 includes an image forming optical system focusing an optical signal received from a subject, and passing through a shutter, and an aperture. The image forming lens system includes a focus lens adjusting a focal point, and a zoom lens adjusting a focal distance.

The optical driving unit 11 may include a focal lens driving unit adjusting a location of the focal lens, an aperture driving unit adjusting opening degree of an aperture, and a shutter driving unit opening or closing the shutter.

The image pickup unit 20 includes an image pick up device that generates an image signal by picking up image light which passed through an image forming optical system of an interchangeable lens. The image pickup device may include a plurality of optoelectronic converters arranged in a matrix form and a vertical or/and horizontal transmission line for reading an image signal by moving electric charges from the plurality of optoelectronic converters in synchronization with a timing signal. Examples of the image pickup device include a Charge Coupled Device (CCD) sensor, a Complementary Metal Oxide Semiconductor (CMOS) sensor. When a CCD sensor is used, a correlated double sampling/amplifier (CDS/AMP) that removes low frequency noise included in an electrical signal output from the image pick up device and amplifies the electrical signal up to a predetermined level, and an A/D converter that converts the electrical signal output from the CDS/AMP into a digital signal may be further included.

Also, the digital camera includes the camera controller 30. The camera controller 30 includes an image signal processor/CPU 31.

The image signal processor/CPU 31 calculates an auto white balance (AWB) evaluation value for adjusting a white balance of an image signal obtained from the image pick up unit 20, an auto-exposure (AE) value for adjusting exposure, and an auto-focusing (AF) evaluation value for adjusting a focal point, and may appropriately control white balance, exposure, and auto-focusing according to the calculated evaluation values. Also, various application operations such as object recognition (e.g., face recognition), scene recognition, etc., may be performed with respect to an input image signal. Also, image processing for keeping records or for displaying may be performed. Examples of image processing include gamma correction, color filter array interpolation, color matrix, color correction, color enhancement, etc. may be performed. Also, an image may be compressed in a joint photographing experts group (JPEG) compression format or a Lempel-Ziv-Welch (LZW) compression format for storage purposes.

Also, the camera controller 30 includes a memory controller 32, a card controller 33, and a display controller 34.

The memory controller 32 may temporarily store captured images and various information in a memory 50 or output the captured images and various information from the memory 50. Also, the memory controller 32 may read program information stored in the memory 50. The memory 50 is a buffer memory in which captured images and various information are temporarily stored. Examples of the memory 50 include a dynamic random access memory (DRAM), or a static DRAM (SDRAM). Also, the memory 50 is a storage unit that stores programs and may be a flash memory, a read only memory (ROM), or the like.

The card controller 33 may store and read image files in the memory card 60 and also the card controller 33 may control reading and storage of not only image files but also various information. A secure card (SD) card may be used as the memory card 60. In the current embodiment, the memory card 60 is used as a storage medium, but the invention is not limited thereto, and the image files and various information may be stored in a recording medium such as an optical disk (e.g., CD, DVD, blu-ray disk, etc.), an optical magnetic disk, a magnetic disk, or the like. When a recording medium such as an optical disk (e.g., CD, DVD, blu-ray disk, etc.), an optical magnetic disk, or a magnetic disk is used, a reading apparatus for reading the same may be further included.

Also, the display controller 34 may control image displaying on the touch screen 70. The touch screen 70 may be a touch panel attached to a display device such as a liquid crystal display (LCD), an organic light emitting display (OLED), etc.

Furthermore, the digital photographing apparatus includes the operating unit 40 for input of control signals by a user. The operating unit 40 may include a component for setting various options for operating the digital photographing apparatus and capturing an image. For example, the operating unit 40 may be embodied as buttons, keys, a touch panel, a touch screen, or a dial, and user control signals for various functions, such as turning power on/off, starting/stopping photographing, starting/stopping/searching playback, driving optics, switching mode, operating menus, and operating selections, may be input via the operating unit 40. For example, a shutter button may be half-pressed, fully pressed, or released by a user. An operation signal for starting focus control is output when a shutter button is half-pressed (operation S1), and the focus control is terminated when the shutter button is released. The shutter button may output an operation signal for starting photographing when the shutter button is fully pressed (operation S2). The operation signals may be transmitted to the image signal processor/CPU 30, and thus, corresponding components may be driven.

Figure 2:
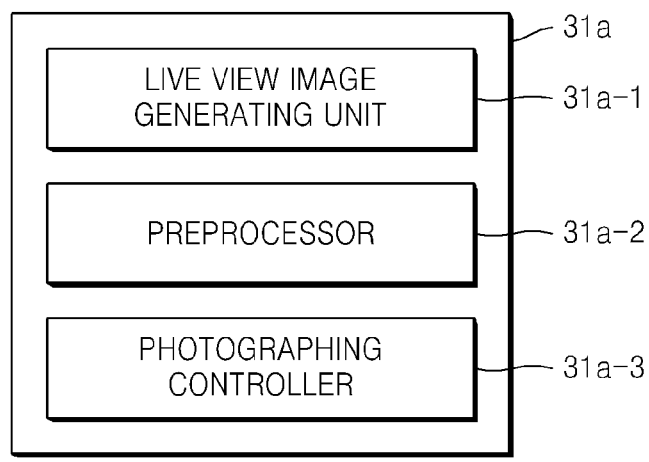
FIG. 2 is a block diagram illustrating an image signal processor/CPU of the digital camera of FIG. 1, according to an embodiment of the invention.

FIG. 2 is a block diagram illustrating an image signal processor/CPU 31*a* of the digital camera, according to an embodiment of the invention.

The image signal processor/CPU 31*a* includes a live view image generating unit 31*a*-1 generating a live view image. The generated live view image is displayed on the touch screen 70 (see FIG. 1). When the user touches an area of the live view image via the touch screen 70, a touch signal is generated, and a preprocessing operation is performed with respect to the live view image. The preprocessing operation may be performed by a preprocessor 31*a*-2. The touched area from the live view image may be preprocessed. At least one of AF, AE, and AWB may be performed as the preprocessing operation. In detail, when an area from the live view image is touched, a focal area including at least a portion of the area is determined, and AF may be performed with respect to the determined focal area. Alternatively, a light metering area including at least a portion of the area may be determined, and AE may be performed with respect to the light metering area.

The image signal processor/CPU 31*a* also includes a photographing controller 31*a*-3 that controls photographing so as to generate a first capture image when the touch continues for a first time period and that controls successive capturing so as to generate at least one second capture image after the first capture image until the touch is ended when the touch continues for a second time period that is longer than the first time period. While the touch continues for the first time period, if the preprocessing operation is not completed, the first capture image may be generated after the preprocessing operation is completed. Alternatively, the first capture image may be generated after the first time period has passed while the preprocessing operation is not completed. Also, when the second time period has passed, consecutive second capture images may be generated. Alternatively, even when the preprocessing operation has failed when the first time period has passed, the first capture image may be generated.

The above operations may be useful when performing successive capturing such as typical successive photographing, panoramic photographing, or bracket photographing, in connection with the preprocessing operations.

Figure 3:
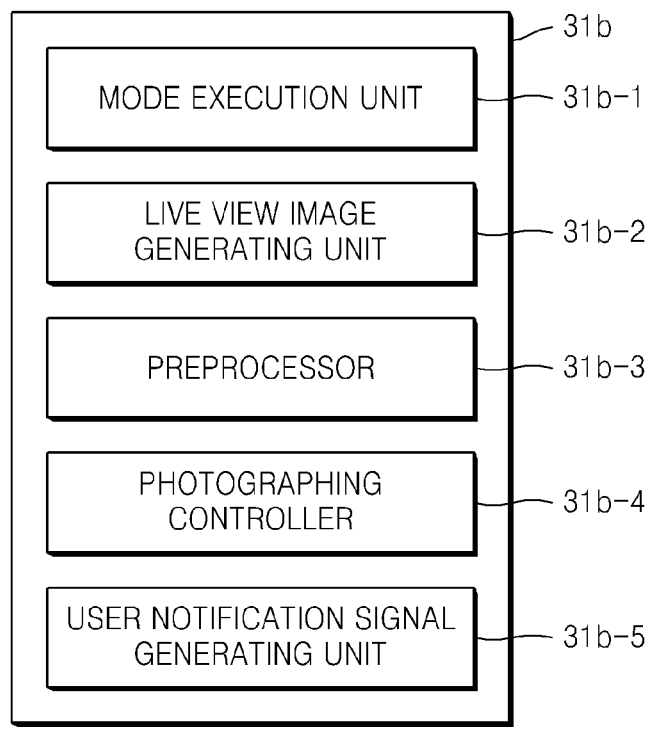
FIG. 3 is a block diagram illustrating an image signal processor/CPU of the digital camera of FIG. 1, according to another embodiment of the invention.

Hereinafter, an image signal processor/CPU 31*b* according to another embodiment of the invention will be described with reference to FIG. 3.

The image signal processor/CPU 31*b* includes a mode execution unit 31*b*-1 that may execute a successive photographing mode, a panoramic photographing mode, or a bracket photographing mode. In the successive photographing mode, a shutter is consecutively opened and closed in series at predetermined intervals to generate a plurality of capture images. The successive photographing mode may be executed when photographing a moving image. In the panoramic photographing mode, the digital image photographing apparatus is moved horizontally at predetermined intervals when a range beyond a maximum viewing angle of the digital image photographing apparatus is to be photographed, and subsequently captured images are synthesized to obtain photographing results of a wide angle above the maximum viewing angle. When bracket photographing is performed, second images are captured under different photographing conditions from a first image.

Also, the image signal processor/CPI 31*b* includes a live view generating unit 31*b*-2, a preprocessor 31*b*-3, and a photographing controller 31*b*-4.

The image signal processor/CPU 31*b* may further include a user notification signal generating unit 31*b*-5 that generates a user notification signal when a preprocessing operation fails with respect to the touched area.

The live view image generating unit 31*b*-2 generates a live view image of a captured image, and the generated live view image is displayed on the touch screen 70 (see FIG. 1). When an area in the displayed live view image is touched, the preprocessor 31*b*-3 may perform a preprocessing operation with respect to a predetermined area including at least a portion of the touched area. When the preprocessing operation fails, the user notification signal generating unit 31*b*-5 may generate a user notification signal. The user notification signal may be generated in the form of an audio signal, an optical signal, or an image signal. For example, an audio signal such as an alarm, or an optical signal emitting light through a light emitting diode (LED), or an image signal displaying an alarming image on the touch screen 70 may be generated as a user notification signal. The user may check the user notification signal to determine whether to keep the touch and capture an image or to touch the touch screen 70 again to perform a new preprocessing operation. When the touch of the user continues for a first time period, the photographing controller 31*b*-4 may control photographing so as to generate a first capture image, and when the touch of the user continues for a second time period that is longer than the first time period, the photographing controller 31*b*-4 may control photographing so as to generate a second capture image. When the touch is maintained for the first time period, photographing may be controlled so as to generate a first capture image after the preprocessing operation is completed, or even when the preprocessing operation has failed, photographing may be controlled so as to generate the first capture image, Hereinafter, a method of controlling a digital image photographing apparatus according to an embodiment of the invention will be described with reference to the attached drawings.

Figure 4:
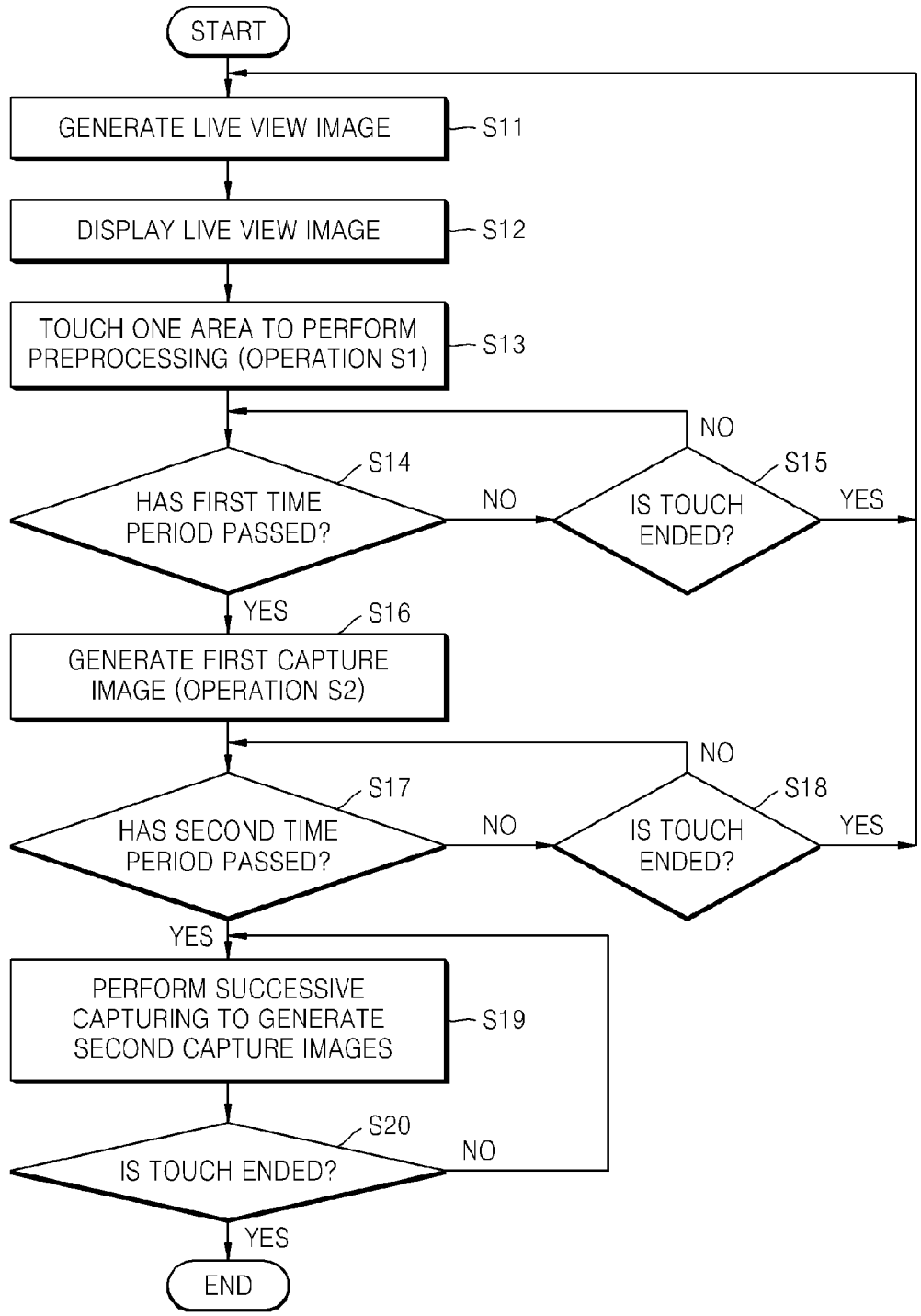
FIG. 4 is a flowchart illustrating a method of controlling a digital image photographing apparatus according to an embodiment of the invention.

FIG. 4 is a flowchart illustrating a method of controlling a digital image photographing apparatus according to an embodiment of the invention.

Referring to FIG. 4, in operation S11, a live view image corresponding to an image signal from a subject that is input via an optical unit and an image pick up unit is generated. Then, in operation S12, the live view image is displayed on a touch screen. The live view image may have a resolution and a frame rate at which it can be displayed on a touch screen in real-time.

In operation S13, a preprocessing operation is performed by touching one area of the live view image. For example, half-pressing the shutter button may correspond to entering operation S1. In operation S14, whether the touch is not a single touch shot but continues over a first time period is determined. When the touch continues over the first time period, a first capture image is generated in operation S16.

If the first time period has not passed, whether the touch is ended is determined in operation S15. When the touch has ended, a live view image is further generated in operation S11, and subsequent operations are performed. If the first time period has not passed and the touch is not ended, counting is further performed to determine whether the first time period has passed or not in operation S14.

In operation S17, the first capture image is generated, and then whether the second time period has passed is determined. The second time period is longer than the first time period. If the second time period has not passed, whether the touch is ended is determined in operation S18. When the touch is ended, a live view image is further generated in operation S11, and subsequent operations are performed. When the second time period has passed, a successive capturing mode is executed to generate second capture images in operation S19. The second capture images may be generated until the touch is ended. Accordingly, in operation S20, whether the touch is ended is determined, and if the touch is not ended, successive capturing is performed continuously to generate second capture images, and when the touch is ended, successive capturing is ended.

FIGS. 5 through 9 illustrate an example in which a method of controlling a digital image photographing apparatus according to the invention is applied to panoramic photographing.

Figure 5:
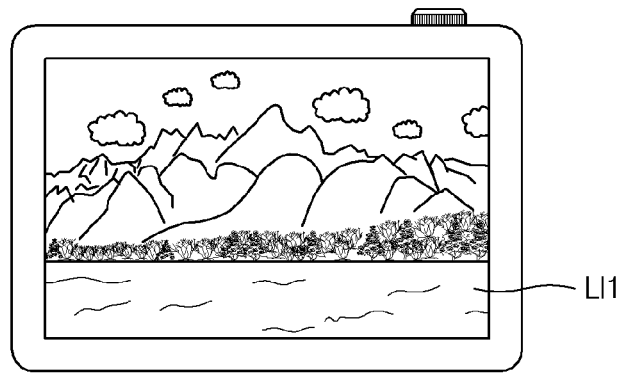
FIGS. 5 through 9 illustrate an example in which a method of controlling a digital image photographing apparatus according to the invention is applied to panoramic photographing.

Referring to FIG. 5, a live view image LI1 is displayed on a touch screen of the digital image photographing apparatus.

Figure 6:
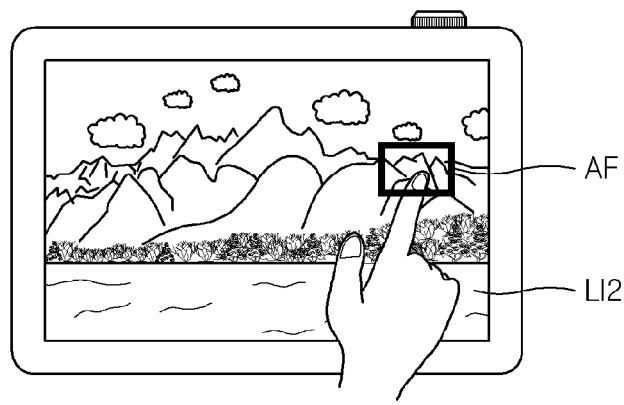

Referring to FIG. 6, the user touches an area of a live view image LI2. Since a live view image is input in real-time, the live view image LI2 according to the current embodiment may be different from the live view image LI1 of FIG. 5. An AF operation is performed as a preprocessing operation with respect to an AF area including at least a portion of the touched one area. When AF is successfully performed, a boundary of the AF area may be displayed with a dark solid line. That is, according to the current embodiment, a user notification signal may be displayed as an image with a thick boundary.

Figure 7:
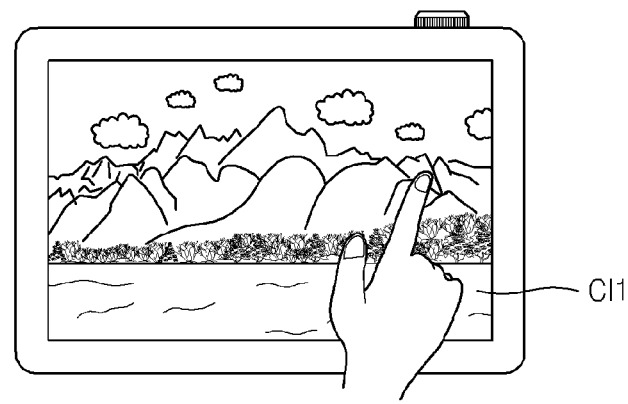

Referring to FIG. 7, when the touch of the user continues for a first time period, photographing is performed. Accordingly, a first capture image CI1 is generated. If the first time period has passed while the preprocessing operation continues, the first capture image may be generated after the preprocessing operation is completed. Alternatively, the first capture image may be generated when the first time period has passed. Even when the preprocessing operation has failed, and if the first time period has passed, the first capture image may be generated.

Figure 8:
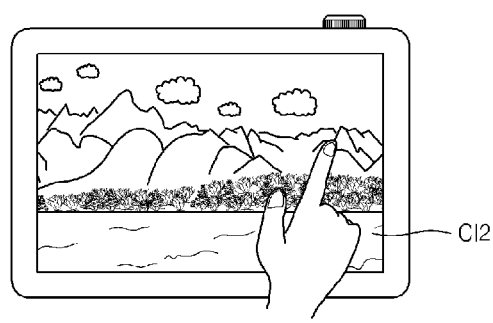

Referring to FIG. 8, when the touch of the user continues for the second time period after the first time period has passed, photographing is performed to generate a second capture image CI2.

Figure 9:
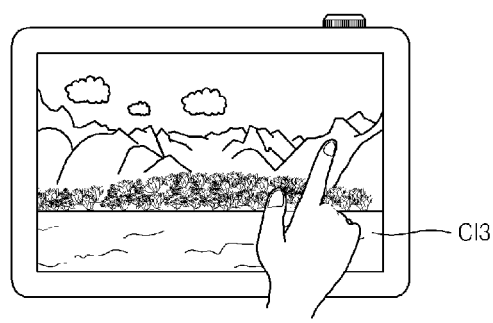

When the touch of the user continues as illustrated in FIG. 9, another second capture image CI3 is generated. Second capture images that are photographed in succession may be generated until the touch of the user is ended.

Accordingly, by using an operating signal like the touch of the user, successive capturing images may be generated in connection with a preprocessing operation.

Figure 10:
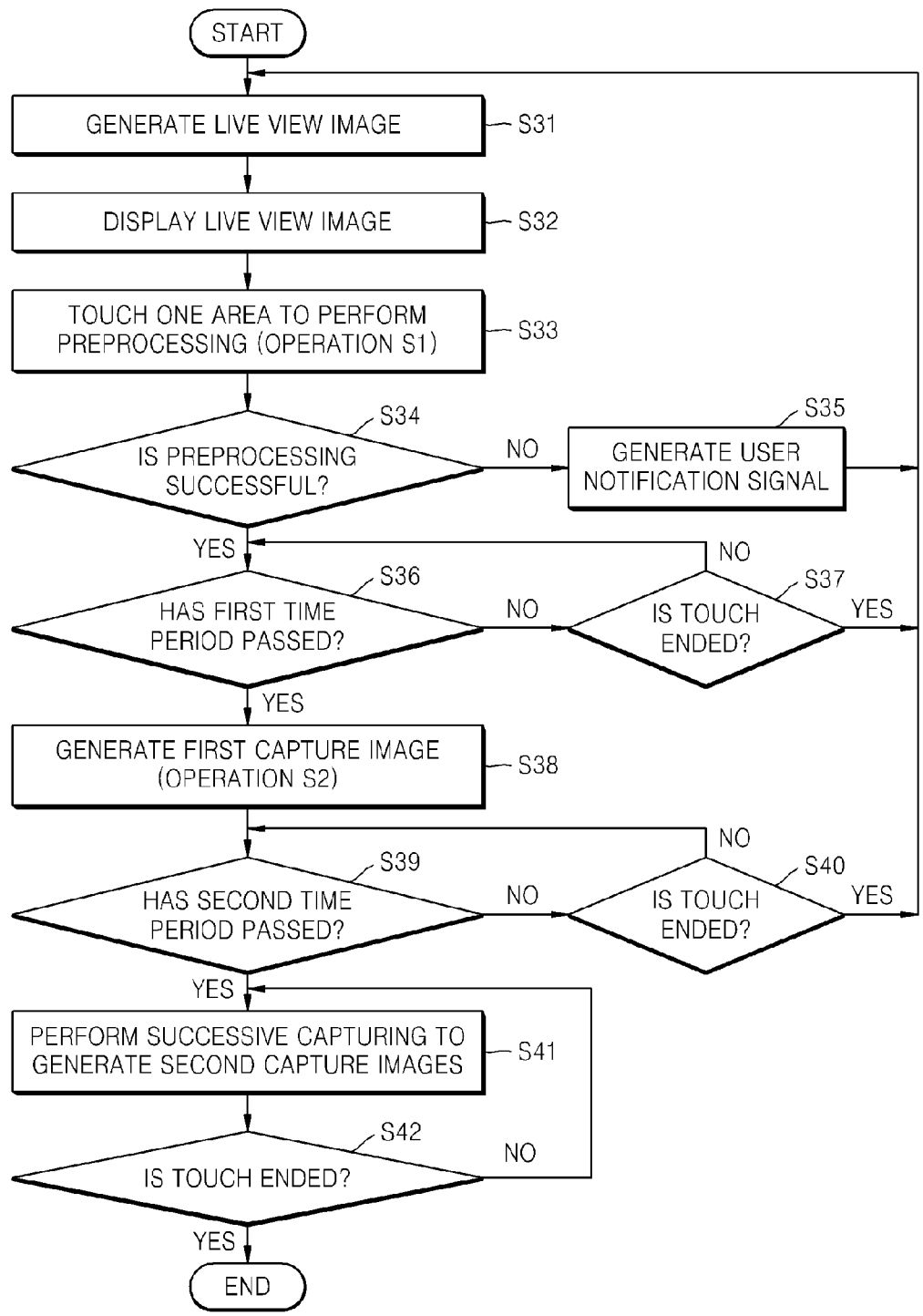
FIG. 10 is a flowchart illustrating a method of controlling a digital image photographing apparatus according to another embodiment of the invention.

FIG. 10 is a flowchart illustrating a method of controlling a digital image photographing apparatus according to another embodiment of the invention.

Referring to FIG. 10, in operation S31, first, a live view image is generated. In operation S32, the generated live view image is displayed. In operation S33, the user touches an area of the displayed live view image and performs a preprocessing operation with respect to the touched area; here, in operation S33, an area that is to be preprocessed and includes at least a portion of the one touched area is determined and a preprocessing operation may be performed with respect to this area.

In operation S34, whether the preprocessing operation is successful is determined.

When the preprocessing operation has failed, a user notification signal is generated in operation S35.

Figure 11:
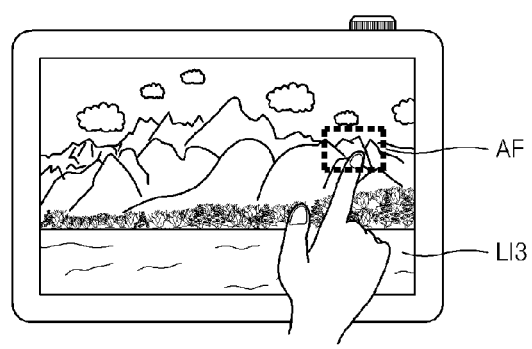
FIG. 11 illustrates an example of generating a user notification signal in the method of controlling a digital image photographing apparatus of FIG. 10.

FIG. 11 illustrates an example of generating a user notification signal in the method of controlling a digital image photographing apparatus of FIG. 10. For example, referring to FIG. 11, when an AF operation is performed with respect to an AF area including at least a portion of the one area touched by the user but the AF operation has failed, a user notification signal displaying a boundary of the AF area with a dotted line is generated. However, the embodiment of the invention is not limited thereto, and other examples of a user notification signal include a sound alarm and an LED warning light.

Referring back to FIG. 10, when the user takes away his/her hand from a touch screen after checking the user notification signal, a live view image is generated again in operation S31, and the live view image is displayed in operation S32. Then subsequent operations may be repeated.

When the preprocessing operation is successful, whether the touch of the user has continued over the first time period or not is determined in operation S36. If the first time period has not passed, whether the touch is ended is determined in operation S37, and when the touch is ended, a live view image is generated again in operation S31, and the live view image is displayed in operation S32. Then subsequent operations may be repeated.

After the first time period has passed, a first capture image is generated in operation S38. Then, in operation S39, whether a second time period has passed is determined. If the second time period has not passed, whether the touch has ended is determined in operation S40, and when the touch is ended, a live view image is generated again in operation S31, and the live view image is displayed in operation S32. Then subsequent operations may be repeated.

If the second time period has passed, a successive capturing is performed to generate second capture images in operation S41. The second capture images may be generated until the touch is ended. Accordingly, whether the touch is ended is determined in operation S42, and when the touch is not ended, successive capturing is further performed to generate the second capture images, and when the touch is ended, the successive capturing is ended.

According to the invention, a focal area is determined by touch, and when the touch is maintained for a first time period, a photographing operation is performed while maintaining an auto-focusing result, and when the touch is maintained for a second time period that is equal to or longer than the first time period, successive capturing is performed until the touch is ended. Thus, auto-focusing is performed by a touching method, and photographing is performed while maintaining an auto-focusing result, and successive capturing may be performed thereafter.

One or more embodiments of the invention provide digital photographing apparatuses and methods of controlling the same, whereby successive capturing may be performed while maintaining an auto-focusing result during touch auto-focusing.

The invention may allow various kinds of change or modification and various changes in form, and specific embodiments will be illustrated in drawings and described in detail in the specification. However, it should be understood that the specific embodiments do not limit the inventive concept to a specific disclosing form but include every modified, equivalent, or replaced one within the spirit and technical scope of the inventive concept. In the description, well-known functions or constructions are not described in detail since they would obscure the invention with unnecessary detail.

Although terms, such as 'first' and 'second', can be used to describe various elements, the elements cannot be limited by the terms. The terms can be used to classify a certain element from another element.

The terminology used in the application is used only to describe specific embodiments and does not have any intention to limit the inventive concept. An expression in the singular includes an expression in the plural unless they are clearly different from each other in a context. In the application, it should be understood that terms, such as 'include' and 'have', are used to indicate the existence of implemented feature, number, step, operation, element, part, or a combination of them without excluding in advance the possibility of existence or addition of one or more other features, numbers, steps, operations, elements, parts, or combinations of them.

An apparatus according to the invention may include a processor, a memory for storing and executing program data, a permanent storage such as a disk drive, a communication port for performing communication with an external device, and a user interface, such as a touch panel, a key, and a button. Methods implemented with a software module or an algorithm may be stored in a computer readable recording medium in the form of computer readable codes or program instructions executable in the processor. Examples of the computer readable recording medium include magnetic storage media (e.g., read-only memory (ROM), random-access memory (RAM), floppy disks, hard disks, etc.) and optical recording media (e.g., CD-ROMs, Digital Versatile Discs (DVDs), etc.). The computer readable recording medium can also be distributed over network coupled computer systems so that the computer readable code is stored and executed in a distributed fashion. The media can be read by a computer, stored in the memory, and executed by the processor.

All cited references including publicized documents, patent applications, and patents cited in the invention can be merged in the invention in the same manner as the shown by individually and concretely merging each cited reference and the shown by generally merging each cited reference in the invention.

For the understanding of the invention, reference numerals are disclosed in the exemplary embodiments shown in the drawings, and specific terms are used to describe the exemplary embodiments of the invention. However, the invention is not limited by the specific terms, and the invention may include all components, which can be commonly thought by those of ordinary skill in the art. The invention can be represented with functional blocks and various processing steps. These functional blocks can be implemented by various numbers of hardware and/or software configurations for executing specific functions. For example, the invention may adopt direct circuit configurations, such as memory, processing, logic, and look-up table, for executing various functions under a control of one or more processors or by other control devices. Like that the components of the invention can execute the various functions with software programming or software elements, the invention can be implemented by a programming or scripting language, such as C, C++, Java, or assembler, with various algorithms implemented by a combination of a data structure, processes, routines, and/or other programming components. Functional aspects can be implemented with algorithms executed in one or more processors. In addition, the invention may adopt the prior art for electronic environment setup, signal processing and/or data processing. The terms, such as "mechanism", "element", "means", and "configuration", can be widely used and are not delimited as mechanical and physical configurations. The terms may include the meaning of a series of routines of software in association with a processor.

Specific executions described in the invention are exemplary embodiments and do not limit the scope of the invention even in any method. For conciseness of the specification, disclosure of conventional electronic configurations, control systems, software, and other functional aspects of the systems may be omitted. In addition, connections or connection members of lines between components shown in the drawings illustrate functional connections and/or physical or circuit connections, and the connections or connection members can be represented by replaceable or additional various functional connections, physical connections, or circuit connections in an actual apparatus. In addition, if there is no concrete mention, such as "requisite" or "important", it may not be a necessarily required component for application of the invention.

The use of the term "said" or a similar directional term in the specification (in particular, in claims) of the invention may correspond to both the singular and the plural. In addition, when a range is disclosed in the invention, inventions to which individual values belonging to the range are applied are included (if there is no disclosure opposed to this), and this is the same as that each of the individual values forming the range is disclosed in the detailed description of the invention. Finally, for steps forming the methods according to the invention, if an order is not clearly disclosed or, if there is no disclosure opposed to the clear order, the steps can be performed in a proper order. The invention is not necessarily limited to the disclosed order of the steps. The use of all illustrations or illustrative terms (for example, and so forth, etc.) in the invention is simply to describe the invention in detail, and the scope of the invention is not limited due to the illustrations or illustrative terms unless they are limited by claims. In addition, it will be understood by those of ordinary skill in the art that various modifications, combinations, and changes can be formed according to design conditions and factors within the scope of the attached claims or the equivalents.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A method of controlling a digital image photographing apparatus including a touch screen, the method comprising:
   generating a live view image corresponding to an image signal from an optical unit and an image pick up unit;
   displaying the live view image on the touch screen; and
   selectively performing a single photographing operation to generate a captured still image or successive photographing operations to generate a plurality of captured still images according to a detected touch duration on the touch screen,
   wherein selectively performing the single photographing operation or the successive photographing operations includes:
   responsive to determining that the touch detected on the touch screen continues for longer than a first time period, performing the single photographing operation, or
   responsive to determining that the touch detected on the touch screen continues for a second time period longer than the first time period, performing the successive photographing operations until the touch is released to generate the plurality of captured still images when the touch detected on the touch screen continues for the second time period, wherein the plurality of captured still images generated by the successive photographing operations are recorded as a plurality of still image files, respectively, and wherein, prior to performing the successive photographing operations, the touch detected on the touch screen initiates a preprocessing operation with respect to a portion of the live view image corresponding to an area of the touch screen where the touch is detected, a result of the preprocessing operation being maintained while performing the successive photographing operations.

2. The method of claim 1, wherein initiating the preprocessing operation includes determining a focal area of the live view image, the focal area corresponding to at least a portion of the area of the touch screen where the touch is detected.

3. The method of claim 1 further comprising:
performing auto-focusing prior to the successive photographing operations, wherein an auto-focusing result is maintained while performing the successive photographing operations.

4. A method of controlling a digital image photographing apparatus including a touch screen, the method comprising:
generating a live view image corresponding to an image signal from an optical unit and an image pick up unit;
displaying the live view image on the touch screen; and
selectively performing, based on a touch detected on the touch screen, successive photographing operations or a single photographing operation,
wherein selectively performing the successive photographing operations or the single photographing operation includes:
performing the successive photographing operations when the touch is detected on the touch screen and the touch continues for a first predetermined duration, wherein the successive photographing operations generate a plurality of captured still images; and
performing the single photographing operation, which generates a single captured still image, when the touch is detected on the touch screen and the touch continues for longer than a second predetermined duration that is shorter than the first predetermined duration,
wherein, prior to performing the successive photographing operations, the touch detected on the touch screen initiates a preprocessing operation with respect to a portion of the live view image corresponding to an area of the touch screen where the touch is detected, a result of the preprocessing operation being maintained while performing the successive photographing operations.

5. The method of claim 4, wherein initiating the preprocessing operation includes determining a focal area of the live view image, the focal area corresponding to at least a portion of the area of the touch screen where the touch is detected.

6. The method of claim 4, wherein the successive photographing operations are performed until the touch is released.

7. The method of claim 4, further comprising performing auto-focusing prior to the successive photographing operations, wherein an auto-focusing result is maintained while performing the successive photographing operations.

8. A digital image photographing apparatus comprising:
an optical unit;
an image pick up unit;
a touch screen that generates a touch signal in response to a touch; and
a controller configured to:
generate a live view image from the optical unit and the image pick up unit and display the live view image on the touch screen;
detect the touch signal generated by the touch screen;
perform successive photographing operations to generate a plurality of captured still images when the touch signal continues for a first predetermined duration; and
perform a single photographing operation, which generates a single captured still image, when the touch signal is detected and continues for a second predetermined duration that is shorter than the first predetermined duration,
wherein, prior to performing the successive photographing operations, the touch signal initiates a preprocessing operation with respect to a portion of the live view image displayed on the touch screen corresponding to an area of the touch screen where the touch is detected, a result of the preprocessing operation being maintained while performing the successive photographing operations.

9. The digital photographing apparatus of claim 8, wherein initiating the preprocessing operation includes determining a focal area of the live view image, the focal area corresponding to at least a portion of the area of the touch screen where the touch is detected.

10. The digital photographing apparatus of claim 8, wherein the successive photographing operations are performed until the touch is released.

11. The digital photographing apparatus of claim 8 further comprising:
an auto-focusing unit that performs auto-focusing prior to the successive photographing operations, wherein an auto-focusing result is maintained while performing the successive photographing operations.

12. A method of controlling a digital image photographing apparatus including a touch screen, the method comprising:
generating a live view image corresponding to an image signal from an optical unit and an image pick up unit;
displaying the live view image on the touch screen; and
selectively performing, based on a touch detected on the touch screen, a single photographing operation or successive photographing operations,
wherein selectively performing the successive photographing operations or the single photographing operation includes:
performing a single photographing operation, which generates a single captured still image, when the touch is detected on the touch screen and the touch continues for longer than a first predetermined duration; and
performing successive photographing operations when the touch is detected on the touch screen and the touch continues for a second predetermined duration that is longer than the first predetermined duration,
wherein the successive photographing operations generate a plurality of captured still images by consecutively opening and closing a shutter at predetermined intervals, and
wherein, prior to performing the successive photographing operations, the touch detected on the touch screen initiates a preprocessing operation with respect to a portion of the live view image corresponding to an area of the touch screen where the touch is detected, a result of the preprocessing operation being maintained while performing the successive photographing operations.

* * * * *